(12) United States Patent
Fukuda

(10) Patent No.: US 12,482,071 B2
(45) Date of Patent: Nov. 25, 2025

(54) IMAGE PROCESSING APPARATUS, IMAGE PROCESSING METHOD, AND IMAGE PROCESSING PROGRAM

(71) Applicant: FUJIFILM Corporation, Tokyo (JP)

(72) Inventor: Wataru Fukuda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 370 days.

(21) Appl. No.: 18/177,994

(22) Filed: Mar. 3, 2023

(65) Prior Publication Data
US 2023/0206412 A1 Jun. 29, 2023

Related U.S. Application Data

(63) Continuation of application No. PCT/JP2021/034626, filed on Sep. 21, 2021.

(30) Foreign Application Priority Data

Sep. 28, 2020 (JP) .................................. 2020-162700

(51) Int. Cl.
G06T 5/50 (2006.01)
A61B 6/00 (2024.01)
(Continued)

(52) U.S. Cl.
CPC ................ G06T 5/50 (2013.01); A61B 6/481 (2013.01); A61B 6/482 (2013.01); G06T 5/94 (2024.01);
(Continued)

(58) Field of Classification Search
CPC .. G06T 5/50; G06T 5/94; G06T 7/174; G06T 11/00; G06T 2207/10116;
(Continued)

(56) References Cited

U.S. PATENT DOCUMENTS 4,551,800 A 11/1985 Riederer et al.
9,724,061 B2 8/2017 Hyung et al.
(Continued)

FOREIGN PATENT DOCUMENTS

DE 10 2011 087128 A1 5/2013
JP 2010-201157 A 9/2010
(Continued)

OTHER PUBLICATIONS

International Search Report issued in PCT/JP2021/034626; mailed Nov. 9, 2021.
(Continued)

Primary Examiner — Oneal R Mistry
Assistant Examiner — Justin Philip Cascais
(74) Attorney, Agent, or Firm — Studebaker Brackett PLLC

(57) ABSTRACT

An image processing apparatus includes at least one processor that is configured to: acquire a low-energy image captured by a radiography apparatus by emitting radiation having first energy to a subject into which a contrast medium has been injected, and a plurality of high-energy images captured by the radiography apparatus by emitting radiation having second energy higher than the first energy at a plurality of different imaging timings after the injection of the contrast medium, and generate a second difference image showing a difference between a plurality of first difference images showing a difference of the low-energy image and each of the plurality of high-energy images to remove a pixel value corresponding to the contrast medium that has permeated outside a region of interest.

11 Claims, 10 Drawing Sheets

(51) Int. Cl.
*G06T 5/94* (2024.01)
*G06T 7/174* (2017.01)
*G06T 11/00* (2006.01)

(52) U.S. Cl.
CPC .............. *G06T 7/174* (2017.01); *G06T 11/00* (2013.01); *G06T 2207/10116* (2013.01); *G06T 2207/20224* (2013.01); *G06T 2207/30068* (2013.01)

(58) Field of Classification Search
CPC . G06T 2207/20224; G06T 2207/30068; A61B 6/481; A61B 6/482; A61B 6/5241; A61B 6/0414; A61B 6/486; A61B 6/502; A61B 6/5217
See application file for complete search history.

(56) References Cited

U.S. PATENT DOCUMENTS

| | | |
|---|---|---|
| 2009/0010380 A1 | 1/2009 | Gotoh |
| 2010/0202675 A1 | 8/2010 | Takanaka et al. |
| 2013/0046176 A1 | 2/2013 | Mistretta et al. |
| 2016/0110892 A1* | 4/2016 | Nett .................... A61B 6/52 600/407 |
| 2016/0113609 A1* | 4/2016 | Tsuyuki ............. A61B 6/482 600/425 |
| 2017/0116730 A1* | 4/2017 | Yamanaka ............. G06T 5/94 |
| 2017/0262989 A1 | 9/2017 | Nempont et al. |
| 2018/0082420 A1* | 3/2018 | Brown .................. G06T 7/0016 |
| 2022/0142597 A1* | 5/2022 | Noda ..................... G06T 5/92 |
| 2022/0366543 A1* | 11/2022 | Iwashita ................ G06T 5/70 |

FOREIGN PATENT DOCUMENTS

| | | | |
|---|---|---|---|
| JP | 2017-538481 A | | 12/2017 |
| JP | 2020054641 A | * | 4/2020 |
| WO | 2007/086369 A1 | | 8/2007 |
| WO | 2013/047193 A1 | | 4/2013 |

OTHER PUBLICATIONS

International Preliminary Report on Patentability (Chapter I) and Written Opinion of the International Searching Authority issued in PCT/JP2021/034626; issued Mar. 28, 2023.

An Office Action; "Notice of Reasons for Refusal," mailed by the Japanese Patent Office on Jan. 9, 2024, which corresponds to Japanese Patent Application No. 2022-552002 and is related to U.S. Appl. No. 18/177,994, with English language translation.

The extended European search report issued by the European Patent Office on Sep. 5, 2023, which corresponds to European Patent Application No. 21872447.4-1126 and is related to U.S. Appl. No. 18/177,994.

Skarpathiotakis M. et al., "Development of contrast digital mammography", Medical Physics, vol. 29, No. 10, Sep. 30, 2002, pp. 2419-2426, AIP, doi: 10.1118/1.1510128.

* cited by examiner

IMAGE PROCESSING APPARATUS, IMAGE PROCESSING METHOD, AND IMAGE PROCESSING PROGRAM

CROSS-REFERENCE TO RELATED APPLICATIONS

This application is a continuation application of International Application No. PCT/JP2021/034626, filed on Sep. 21, 2021, which is incorporated herein by reference in its entirety. Further, this application claims priority from Japanese Patent Application No. 2020-162700, filed on Sep. 28, 2020, the disclosure of which is incorporated by reference herein in their entirety.

BACKGROUND

Technical Field

The present disclosure relates to an image processing apparatus, an image processing method, and a non-transitory storage medium storing an image processing program.

Related Art

A technology of performing contrast imaging of capturing a low-energy image and a high-energy image by irradiating a subject into which a contrast medium has been injected with radiation having different energies to generate a difference image showing a difference between the high-energy image and the low-energy image. For example, in WO2013/047193A, a technology of performing energy sub-moving image capturing in an angiography method is known.

By the way, the difference image showing the difference between the high-energy image and the low-energy image is an image in which the contrast medium is clearly reflected and from which a lesion in which a contrast medium has permeated or a body tissue other than a region of interest is removed. However, the contrast medium also permeates a normal body tissue that is not the lesion or the like, although the amount is relatively small as compared with the lesion or the like. For example, in the contrast imaging for a tumor of a breast, the contrast medium mainly permeates the tumor, but the contrast medium also permeates a normal mammary gland structure or fat tissue, although the amount is relatively small. Therefore, in the difference image between the high-energy image and the low-energy image, it may be difficult to see the region of interest.

SUMMARY

The present disclosure is made in view of the above circumstances, and provides an image processing apparatus, an image processing method, and a non-transitory storage medium storing an image processing program capable of making it easier to see a region of interest in which a contrast medium has permeated in a radiation image.

A first aspect of the present disclosure relates to an image processing apparatus comprising at least one processor, in which the processor acquires a low-energy image captured by a radiography apparatus by emitting radiation having first energy to a subject into which a contrast medium has been injected, and a plurality of high-energy images captured by the radiography apparatus by emitting radiation having second energy higher than the first energy at a plurality of different imaging timings after the injection of the contrast medium, and generates a second difference image showing a difference between a plurality of first difference images showing a difference of the low-energy image and each of the plurality of high-energy images to remove a pixel value corresponding to the contrast medium that has permeated outside a region of interest.

A second aspect of the present disclosure relates to the image processing apparatus according to the first aspect, in which the processor identifies a coefficient at which a sum of pixel values of the second difference image is the smallest, and generates the second difference image by subtracting image data obtained by multiplying one first difference image among the plurality of first difference images by the coefficient from image data of the other first difference image for each corresponding pixel.

A third aspect of the present disclosure relates to the image processing apparatus according to the first aspect, in which the processor identifies a coefficient at which a sum of pixel values outside the region of interest in the second difference image is the smallest, and generates the second difference image by subtracting image data obtained by multiplying one first difference image among the plurality of first difference images by the coefficient from image data of the other first difference image for each corresponding pixel.

A fourth aspect of the present disclosure relates to the image processing apparatus according to any one of the first to third aspects, in which the processor generates the second difference image after matching contrasts of the plurality of first difference images with each other.

A fifth aspect of the present disclosure relates to the image processing apparatus according to the fourth aspect, in which the processor matches contrasts of at least one of a mammary gland structure or a region other than a region of interest in the first difference image.

A sixth aspect of the present disclosure relates to the image processing apparatus according to any one of the first to fifth aspects, in which the processor normalizes the second difference image based on an interval of the plurality of imaging timings.

A seventh aspect of the present disclosure relates to the image processing apparatus according to any one of the first to sixth aspects, in which the processor performs image processing of enhancing the region of interest on the second difference image.

An eighth aspect of the present disclosure relates to the image processing apparatus according to any one of the first to seventh aspects, in which the processor acquires, as the low-energy image, a plurality of low-energy images captured by the radiography apparatus by emitting the radiation having the first energy at the imaging timing of each of the plurality of high-energy images, and generates, for each imaging timing, a first difference image showing a difference of each of the plurality of low-energy images and each of the plurality of high-energy images.

A ninth aspect of the present disclosure relates to the image processing apparatus according to any one of the first to seventh aspects, in which the processor acquires, as the low-energy image, a plurality of low-energy images captured by the radiography apparatus by emitting the radiation having the first energy at the imaging timing of each of the plurality of high-energy images, generates a third difference image showing a difference between the plurality of high-energy images and a fourth difference image showing a difference between the plurality of low-energy images, and generates the second difference image by generating an image showing a difference between the third difference image and the fourth difference image.

A tenth aspect of the present disclosure relates to the image processing apparatus according to any one of the first to seventh aspects, in which the processor generates the plurality of first difference images by using a common low-energy image.

An eleventh aspect of the present disclosure relates to an image processing method executed by a computer, the method comprising acquiring a low-energy image captured by a radiography apparatus by emitting radiation having first energy to a subject into which a contrast medium has been injected, and a plurality of high-energy images captured by the radiography apparatus by emitting radiation having second energy higher than the first energy at a plurality of different timings after the injection of the contrast medium, generating a plurality of first difference images showing a difference between the low-energy image and each of the plurality of high-energy images, and generating a second difference image showing a difference between the plurality of first difference images to remove a pixel value corresponding to the contrast medium that has permeated outside a region of interest.

A twelfth aspect of the present disclosure relates to a non-transitory storage medium storing a program causing a computer to execute an image processing, the image processing comprising: acquiring a low-energy image captured by a radiography apparatus by emitting radiation having first energy to a subject into which a contrast medium has been injected, and a plurality of high-energy images captured by the radiography apparatus by emitting radiation having second energy higher than the first energy at a plurality of different timings after the injection of the contrast medium, generating a plurality of first difference images showing a difference between the low-energy image and each of the plurality of high-energy images, and generating a second difference image showing a difference between the plurality of first difference images to remove a pixel value corresponding to the contrast medium that has permeated outside a region of interest.

According to the present disclosure, it is possible to make it easier to see the region of interest in which the contrast medium has permeated in the radiation image.

DETAILED DESCRIPTION

In the following, an embodiment of the present invention will be described in detail with reference to the drawings. It should be noted that the present embodiment does not limit the present invention.

Figure 1:
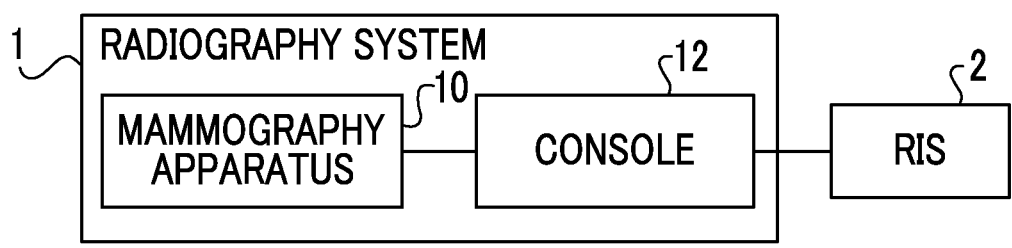
FIG. 1 is a configuration diagram schematically showing an example of an overall configuration of a radiography system according to an embodiment.

First, an example of an overall configuration of a radiography system according to the present embodiment will be described. FIG. 1 shows a configuration diagram showing an example of an overall configuration of a radiography system 1 according to the present embodiment. As shown in FIG. 1, the radiography system 1 according to the present embodiment comprises a mammography apparatus 10 and a console 12. The mammography apparatus 10 according to the present embodiment is an example of a radiography apparatus according to the present disclosure. In addition, the console 12 according to the present embodiment is an example of an image processing apparatus according to the present disclosure.

Figure 2:
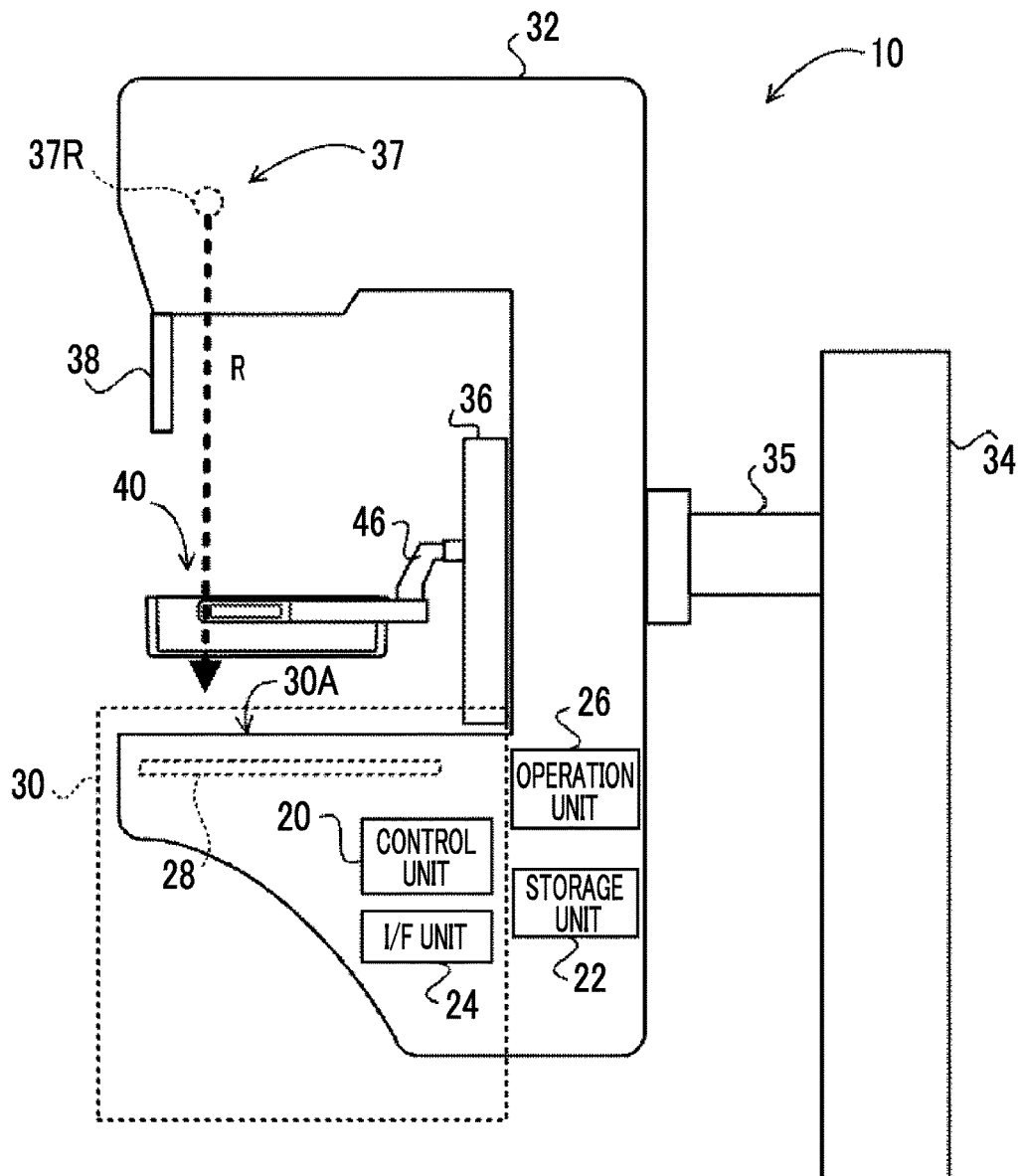
FIG. 2 is a side view showing an example of an appearance of a mammography apparatus according to the embodiment.

First, the mammography apparatus 10 according to the present embodiment will be described. FIG. 2 shows a side view showing an example of an appearance of the mammography apparatus 10 according to the present embodiment. It should be noted that FIG. 2 shows the example of the appearance of the mammography apparatus 10 as viewed from a right side of an examinee.

The mammography apparatus 10 according to the present embodiment is an apparatus that uses a breast of the examinee as a subject and captures a radiation image of the breast by irradiating the breast with radiation R (for example, X-rays). It should be noted that the mammography apparatus 10 may be an apparatus that images the breast of the examinee in a state in which the examinee is sitting on a chair (including a wheelchair) or the like (sitting state) in addition to a state in which the examinee is standing (standing state).

In addition, the mammography apparatus 10 according to the present embodiment has a function of performing two types of imaging of so-called contrast imaging in which the imaging is performed in a state in which a contrast medium has been injected into the breast of the examinee and general imaging. It should be noted that, in the present embodiment, the imaging to be performed in a state in which the contrast medium has been injected into the breast of the examinee refers to the "contrast imaging", and the imaging that is not the contrast imaging refers to the "general imaging".

As shown in FIG. 2, the mammography apparatus 10 according to the present embodiment comprises a control unit 20, a storage unit 22, and an interface (I/F) unit 24 inside the imaging table 30. The control unit 20 controls an overall operation of the mammography apparatus 10 under the control of the console 12. The control unit 20 comprises a central processing unit (CPU), a read only memory (ROM), and a random access memory (RAM) (all not shown). The ROM stores, in advance, various programs, including an imaging processing program for performing control related to radiation image capturing, which is executed by the CPU. The RAM transitorily stores various data.

The storage unit 22 stores the image data of the radiation image captured by the radiation detector 28 or various types of other information. Specific examples of the storage unit 22 include a hard disk drive (HDD) and a solid state drive (SSD). The I/F unit 24 performs communication of various types of information with the console 12 by wireless communication or wired communication. The image data of the radiation image captured by the radiation detector 28 in the mammography apparatus 10 is transmitted to the console 12 via the I/F unit 24 by wireless communication or wired communication.

In addition, an operation unit 26 is provided as a plurality of switches on an imaging table 30 of the mammography apparatus 10, for example. It should be noted that the operation unit 26 may be provided as a touch panel type switch, or may be provided as a foot switch operated by a user, such as a doctor or an engineer with a foot.

The radiation detector 28 detects the radiation R that has passed through the breast which is the subject. In addition, as shown in FIG. 2, the radiation detector 28 is disposed inside the imaging table 30. In the mammography apparatus 10 according to the present embodiment, the user positions the breast of the examinee on an imaging surface 30A of the imaging table 30 in a case of performing the imaging.

The radiation detector 28 detects the radiation R transmitted through the breast of the examinee and the imaging table 30, generates a radiation image based on the detected radiation R, and outputs image data representing the generated radiation image. A type of the radiation detector 28 according to the present embodiment is not particularly limited. For example, a radiation detector of an indirect conversion method that converts the radiation R into light and converts the converted light into a charge may be used, and a radiation detector of a direct conversion method that directly converts the radiation R into a charge may be used.

A radiation emitting unit 37 comprises the radiation source 37R. As shown in FIG. 2, the radiation emitting unit 37 is provided in an arm part 32 together with the imaging table 30 and the compression unit 36. As shown in FIG. 2, a face guard 38 is attachable and detachable at a position near the examinee on the arm part 32 below the radiation emitting unit 37. The face guard 38 is a protective member for protecting the examinee from the radiation R emitted from the radiation source 37R.

It should be noted that, as shown in FIG. 2, the mammography apparatus 10 according to the present embodiment comprises the arm part 32, a base 34, and a shaft part 35. The arm part 32 is held by the base 34 to be movable in a vertical direction (Z-axis direction). The shaft part 35 connects the arm part 32 to the base 34. In addition, the arm part 32 is rotatable relative to the base 34 with the shaft part 35 as a rotation axis.

The arm part 32, the imaging table 30, and the compression unit 36 can be separately rotated relative to the base 34 with the shaft part 35 as a rotation axis. In the present embodiment, the base 34, the arm part 32, the imaging table 30, and the compression unit 36 are each provided with an engaging part (not shown), and each of the arm part 32, the imaging table 30, and the compression unit 36 is connected to the base 34 by switching a state of the engaging part. One or two of the arm part 32, the imaging table 30, or the compression unit 36, which are connected to the shaft part 35, are integrally rotated around the shaft part 35.

The compression unit 36 is provided with a compression plate driving unit (not shown) that moves the compression plate 40 in the vertical direction (Z-axis direction). The compression plate 40 according to the present embodiment has a function of compressing the breast of the examinee. A support part 46 of the compression plate 40 is attachably and detachably attached to the compression plate driving unit, is moved in the vertical direction (Z-axis direction) by the compression plate driving unit, and compresses the breast of the examinee with the imaging table 30.

On the other hand, the console 12 according to the present embodiment has a function of controlling the mammography apparatus 10 by using an imaging order and various types of information acquired from a radiology information system (RIS) 2 via a wireless communication local area network (LAN) and the like, and an instruction performed by the user by an operation unit 56 and the like.

Figure 3:
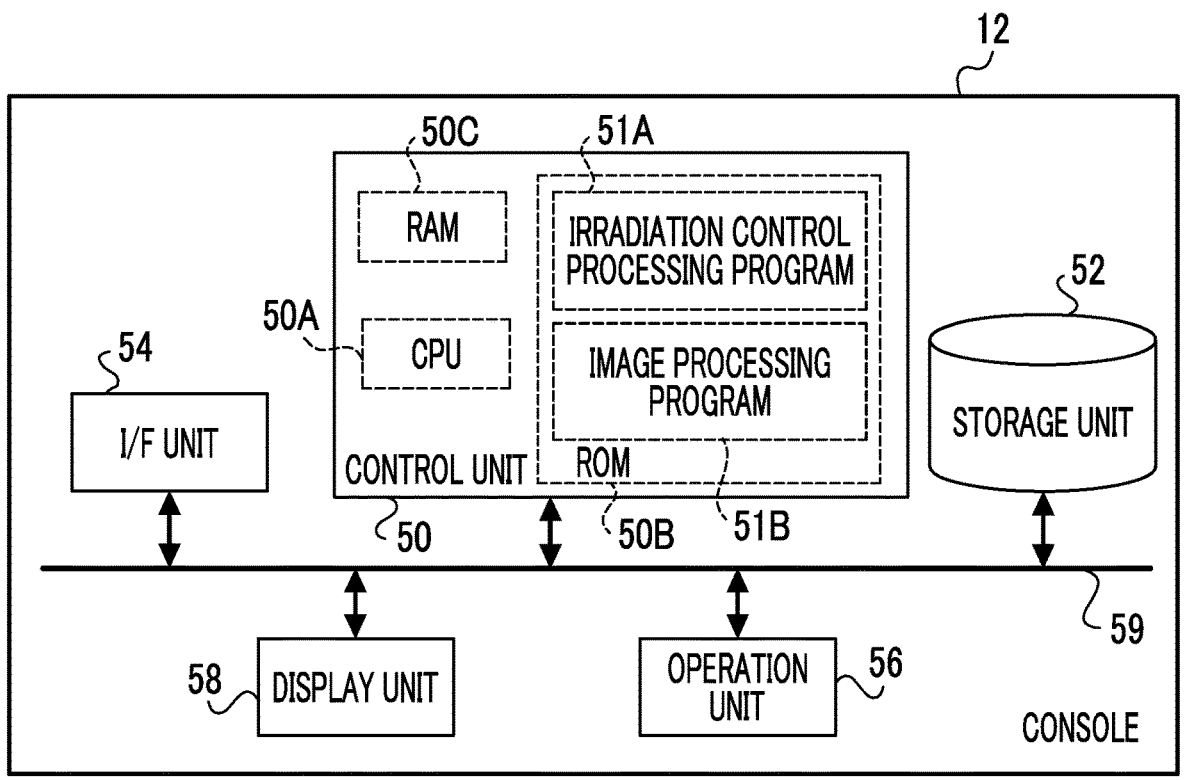
FIG. 3 is a block diagram showing an example of a configuration of a console according to the embodiment.

The console 12 according to the present embodiment is, for example, a server computer. As shown in FIG. 3, the console 12 comprises a control unit 50, a storage unit 52, an I/F unit 54, the operation unit 56, and a display unit 58. The control unit 50, the storage unit 52, the I/F unit 54, the operation unit 56, and the display unit 58 are connected to each other via a bus 59, such as a system bus or a control bus, such that various types of information can be exchanged.

The control unit 50 according to the present embodiment controls an overall operation of the console 12. The control unit 50 comprises a CPU 50A, a ROM 50B, and a RAM 50C. The ROM 50B stores, in advance, various programs including an irradiation control processing program 51A and an image processing program 51B, which are executed by the CPU 50A and will be described below. The RAM 50C transitorily stores various data. The CPU 50A according to the present embodiment is an example of a processor according to the present disclosure. The image processing program 51B according to the present embodiment is an example of an image processing program according to the present disclosure.

The storage unit 52 stores the image data of the radiation image captured by the mammography apparatus 10 or various types of other information. Specific examples of the storage unit 52 include an HDD and an SSD.

The operation unit 56 is used by the user to input the instruction, various types of information, and the like related to the radiation image capturing and the like, including an irradiation instruction of the radiation R. The operation unit 56 is not particularly limited, and examples thereof include various switches, a touch panel, a touch pen, and a mouse. The display unit 58 displays various types of information. It should be noted that the operation unit 56 and the display unit 58 may be integrated to form a touch panel display.

The I/F unit 54 performs communication of various types of information between the mammography apparatus 10 and the RIS 2 by wireless communication or wired communication. The console 12 according to the present embodiment receives the image data of the radiation image captured by the mammography apparatus 10 from the mammography apparatus 10 via the I/F unit 54 by wireless communication or wired communication.

Figure 4:
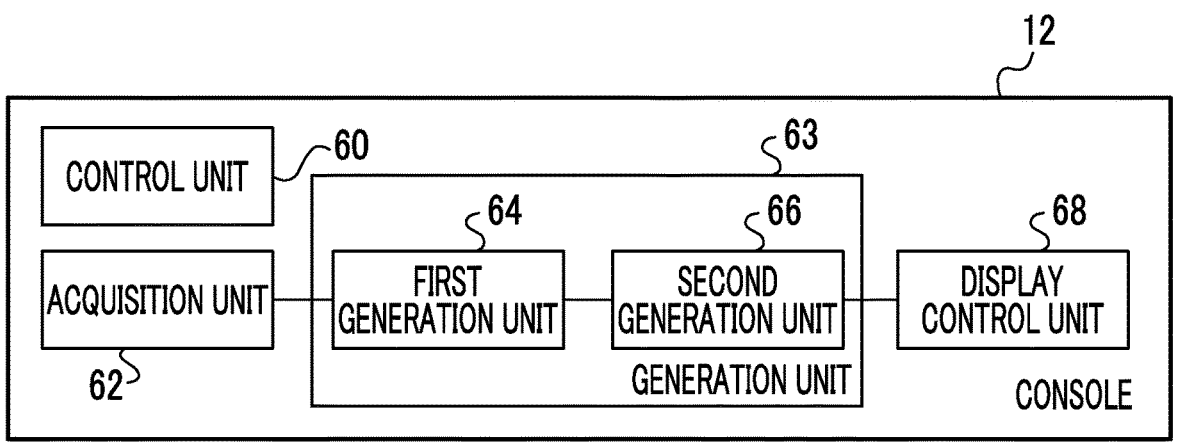
FIG. 4 is a functional block diagram showing an example of a function of the console according to the embodiment.

Further, FIG. 4 shows a functional block diagram of an example of the configuration of the console 12 according to the present embodiment. As shown in FIG. 4, the console 12 comprises a control unit 60. As an example, in the console 12 according to the present embodiment, the CPU 50A of the control unit 50 functions as the control unit 60 by the CPU 50A executing the irradiation control processing program 51A stored in the ROM 50B.

The control unit 60 has a function of performing control related to the irradiation with the radiation R in the mammography apparatus 10 in the contrast imaging. In the present embodiment, in a case of performing the contrast imaging, the radiation image is captured by emitting the radiation having the first energy from the radiation source 37R to the breast in a state in which the contrast medium has been injected. In addition, the radiation image is captured by emitting the radiation having the second energy higher than the first energy from the radiation source 37R to the breast in a state in which the contrast medium has been injected. It should be noted that, in the present embodiment, the radiation image captured by emitting the radiation R having the first energy is referred to as a "low-energy image", and the radiation image captured by emitting the radiation R having the second energy is referred to as a "high-energy image". In addition, in a case in which the images captured by the mammography apparatus 10 are collectively referred to without distinction between types, such as the low-energy image and the high-energy image, the images are simply referred to as the "radiation image".

For example, an iodine contrast medium with a k-absorption edge of 32 keV is generally used as the contrast medium for the contrast imaging. In the contrast imaging in this case, the low-energy image is captured by emitting the radiation R having the first energy lower than the k-absorption edge of the iodine contrast medium. In addition, the high-energy image is captured by emitting the radiation R having the second energy higher than the k-absorption edge of the iodine contrast medium.

Therefore, in the contrast imaging, the control unit 60 according to the present embodiment performs control of emitting the radiation R having the first energy from the radiation source 37R and control of emitting the radiation R having the second energy. In other words, the control unit 60 performs control of causing the mammography apparatus 10 to capture the low-energy image and control of causing the mammography apparatus 10 to capture the high-energy image.

A body tissue, such as a mammary gland, and the contrast medium have different absorption characteristics of the radiation. Therefore, the contrast medium is clearly reflected in the high-energy image captured as described above. In addition, in the low-energy image, almost no contrast medium is reflected, and the body tissue, such as the mammary gland, is clearly reflected. Therefore, the difference image showing a difference between the low-energy image and the high-energy image can be made to be an image in which a mammary gland structure is removed and the contrast medium is clearly reflected. The contrast amount with the contrast medium appears in the pixel value of the difference image.

Figure 5:
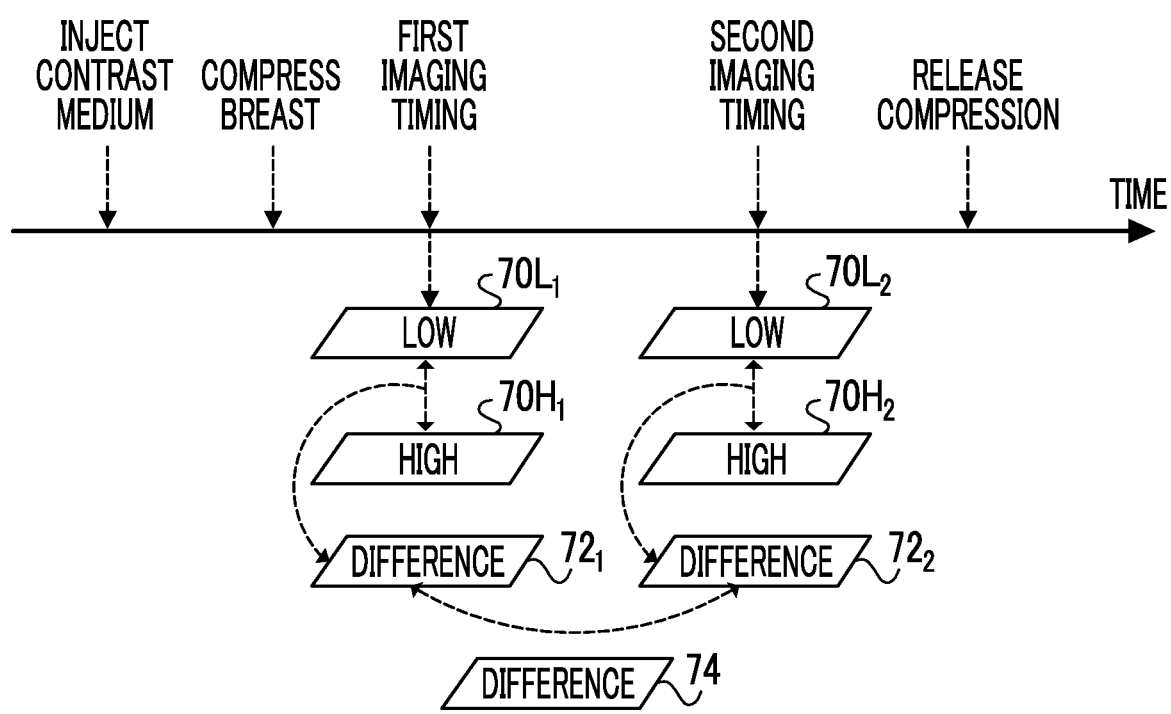
FIG. 5 is a diagram for describing an example of a generation method of a first difference image and a second difference image.

In addition, in the contrast imaging, capturing of the low-energy image and the high-energy image is regarded as capturing of a set of difference images, and the difference images are captured at a plurality of different imaging timings. In the example shown in FIG. 5, the low-energy image 70L (see FIG. 5, $70L_1$) and the high-energy image 70H (see FIG. 5, $70H_1$) are captured at a first imaging timing. In addition, the low-energy image 70L (see FIG. 5, $70L_2$) and the high-energy image 70H (see FIG. 5, $70H_2$) are captured at a second imaging timing after a predetermined time has elapsed from the first imaging timing.

It should be noted that the predetermined time from the first imaging timing to the second imaging timing is not limited. For example, the predetermined time may be a time determined depending on a contrast condition, for example, in consideration of the type of the object of interest, or may be a time determined in consideration of a thickness, a composition, or the like of the breast which is the subject.

In addition, the console 12 according to the present embodiment comprises an acquisition unit 62, a generation unit 63, and a display control unit 68. As an example, in the console 12 according to the present embodiment, the CPU 50A of the control unit 50 also functions as the acquisition unit 62, the generation unit 63, and the display control unit 68 by the CPU 50A executing the image processing program 51B stored in the ROM 50B.

The acquisition unit 62 has a function of acquiring the low-energy image and the high-energy image captured by the mammography apparatus 10. Specifically, the acquisition unit 62 acquires image data representing the low-energy image and image data representing the high-energy image captured by the radiation detector 28 of the mammography apparatus 10 via the I/F unit 24 and the I/F unit 54. The acquisition unit 62 outputs the acquired low-energy image and high-energy image to the generation unit 63.

The generation unit 63 has a function of generating a second difference image showing a difference between a plurality of difference images showing a difference of the low-energy image and each of a plurality of high-energy images to remove a pixel value corresponding to the contrast medium that has permeated outside a region of interest. As shown in FIG. 4, the generation unit 63 according to the present embodiment includes a first generation unit 64 and a second generation unit 66.

The first generation unit 64 has a function of generating the plurality of difference images showing a difference between the low-energy image and each of the plurality of high-energy images captured at each imaging timing. It should be noted that, hereinafter, the difference image showing the difference between the high-energy image and the low-energy image is referred to as a first difference image. The difference image generated by the first generation unit 64 according to the present embodiment is the first difference image, and is an example of a first difference image according to the present disclosure. The first generation unit 64 outputs the plurality of generated first difference images to the second generation unit 66.

As an example, in the present embodiment, the first difference image is generated by deriving the difference between the low-energy image and each high-energy image. In the example shown in FIG. 5, the first generation unit 64 generates a first difference image $72_1$ between the low-energy image $70L_1$ captured at the first imaging timing and the high-energy image $70H_1$. Specifically, the first generation unit 64 generates the image data representing the first difference image in which the mammary gland tissue is removed and the contrast medium is enhanced, by subtracting image data obtained by multiplying the low-energy image $70L_1$ by a predetermined coefficient from image data obtained by multiplying the high-energy image $70H_1$ by a predetermined coefficient for each corresponding pixel. Similarly, the first generation unit 64 generates a first difference image $72_2$ between the low-energy image $70L_2$ and the high-energy image $70H_2$ captured at the second imaging timing.

The second generation unit 66 has a function of generating a difference image showing the difference between the plurality of first difference images generated by the first generation unit 64. It should be noted that, hereinafter, the difference image showing the difference between the first difference images will be referred to as a second difference image. The difference image generated by the second generation unit 66 according to the present embodiment is the second difference image, and is an example of a second difference image according to the present disclosure. The second generation unit 66 outputs the generated second difference image to the display control unit 68.

As an example, in the present embodiment, the second difference image showing the difference between the first difference image between the high-energy image and the low-energy image captured at the second imaging timing and the first difference image between the high-energy image and the low-energy image captured at the first imaging timing is generated. In the example shown in FIG. 5, the second generation unit 66 generates a second difference image 74 showing the difference between the first difference image 72₂ generated at the second imaging timing and the first difference image 72₁ generated at the first imaging timing.

The second difference image (second difference image 74 in FIG. 5) generated by the second generation unit 66 will be described with reference to FIG. 6. In other words, the second difference image, which is generated by the generation unit 63 and output to the display control unit 68, will be described.

Figure 6:
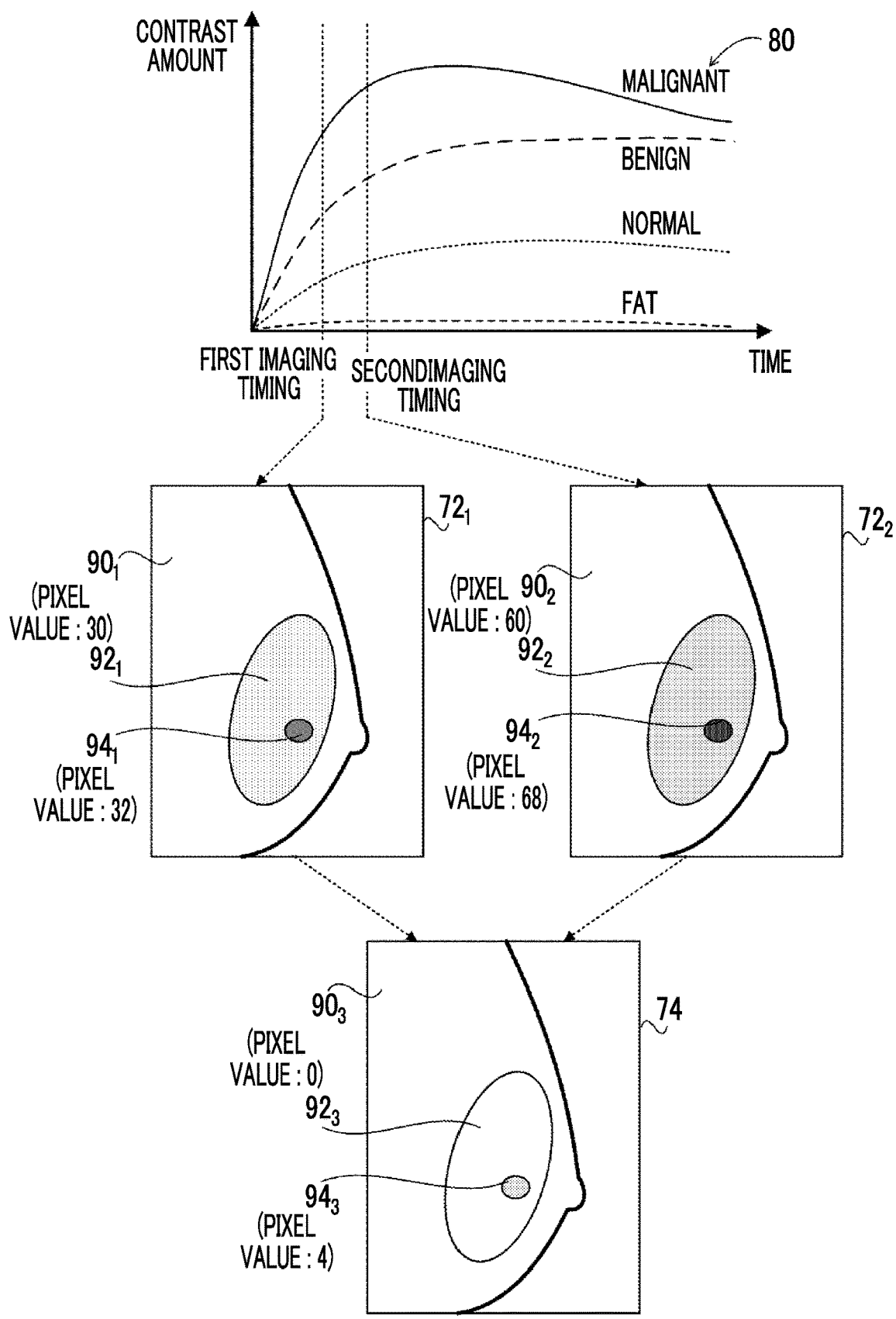
FIG. 6 is a diagram showing an example of the generation of the second difference image.

As shown in a graph 80 showing a correspondence relationship between the time and the contrast amount in FIG. 6, the contrast medium more easily permeates a lesion, such as a tumor, than a normal mammary gland (see "normal" in the graph 80). Also, as the lesion is more malignant (see "malignant" in the graph 80), the contrast medium tends to permeate faster and the contrast medium tends to be washed out faster than in a case in which the lesion is benign (see "benign" in the graph 80). In addition, as shown in the graph 80, the contrast medium also permeates fat (see "fat" in the graph 80), although the amount is smaller than that of the lesion or the mammary gland.

Therefore, the first difference image showing the difference between the high-energy image and the low-energy image may be an image in which the contrast medium that has permeated fat or the mammary gland structure is reflected. In the example shown in FIG. 6, in the first difference image 72₁ obtained at the first imaging timing, the contrast medium is reflected in both a normal region 92₁ corresponding to the normal mammary gland and a region of interest 94₁ in a breast 90₁. In addition, in the first difference image 72₂ obtained at the second imaging timing, the contrast medium is reflected in both a normal region 92₂ corresponding to the normal mammary gland and a region of interest 94₂ in a breast 90₂.

As can be seen from the graph 80 in FIG. 6, the contrast amount of the normal region 92₂ in the first difference image 72₂ is larger than the contrast amount of the normal region 92₁ in the first difference image 72₁. In addition, the contrast amount of the region of interest 94₂ in the first difference image 72₂ is larger than the contrast amount in the region of interest 94₁ in the first difference image 72₁. In addition, an amount of change from the contrast amount of the region of interest 94₁ to the contrast amount of the region of interest 94₂ is larger than an amount of change from the contrast amount of the normal region 92₁ to the contrast amount of the normal region 92₂.

Therefore, by generating the second difference image 74 showing the difference between the first difference image 72₂ obtained at the second imaging timing and the first difference image 72₁ obtained at the first imaging timing, the second difference image 74 can be made to be an image in which the contrast medium that has permeated a normal mammary gland structure outside the region of interest is not reflected. In the example shown in FIG. 6, a pixel value of the normal region 92₁ of the first difference image 72₁ is set to "30", a pixel value of the region of interest 94₁ is set to "32", a pixel value of the normal region 92₂ of the first difference image 72₂ is set to "60", and a pixel value of the region of interest 94₂ is set to "68". In this case, in the second difference image 74 generated by subtracting the image data obtained by multiplying the first difference image 72₁ by "2" as a predetermined removal coefficient from the image data of the first difference image 72₂ for each corresponding pixel, a pixel value of a normal region 92₃ is set to "0", and a pixel value of a region of interest 94₃ is set to "4". As described above, in the example shown in FIG. 6, the second difference image 74 can be made to be an image in which the contrast amount is not reflected in the normal region 92₃.

As described above, in the present embodiment, the second generation unit 66 generates the second difference image 74 showing the difference between the first difference image 72₂ and the first difference image 72₁, so that the second difference image 74 can be made to be an image in which the pixel value corresponding to the contrast medium that has permeated outside the region of interest is removed. It should be noted that the removal of the pixel value corresponding to the contrast medium is not limited to a case of complete removal, and includes, for example, a case of a slight amount of residual.

The display control unit 68 has a function of displaying, on the display unit 58, the second difference image generated by the generation unit 63.

Next, an action of the console 12 in the contrast imaging by the radiography system 1 according to the present embodiment will be described with reference to the drawings.

Figure 7:
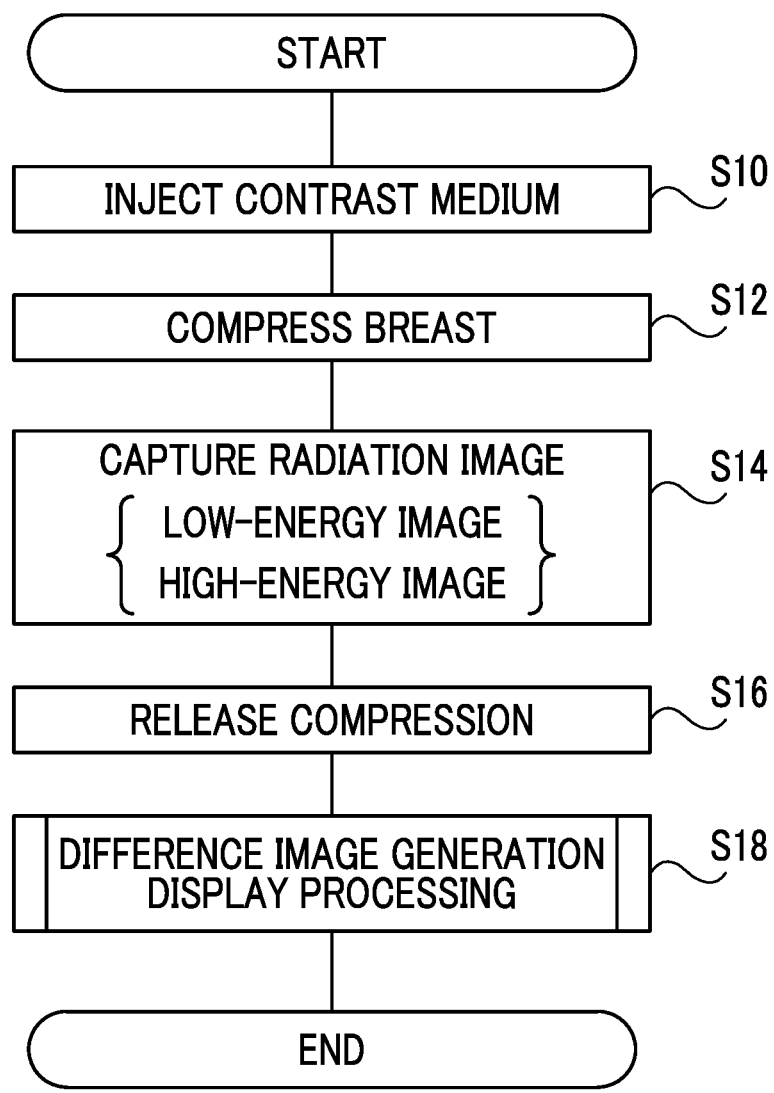
FIG. 7 is a flowchart showing an example of a flow of contrast imaging by the radiography system according to the embodiment.

FIG. 7 shows a flowchart showing an example of a flow of the contrast imaging by the radiography system 1 according to the present embodiment. In a case in which the contrast imaging is performed, first, the user injects the contrast medium into the breast, which is the subject, as shown in step S10 of FIG. 7. Next, as shown in step S12, the user positions the breast of the examinee on the imaging table 30 of the mammography apparatus 10 and compresses the breast with the compression plate 40.

Figure 8:
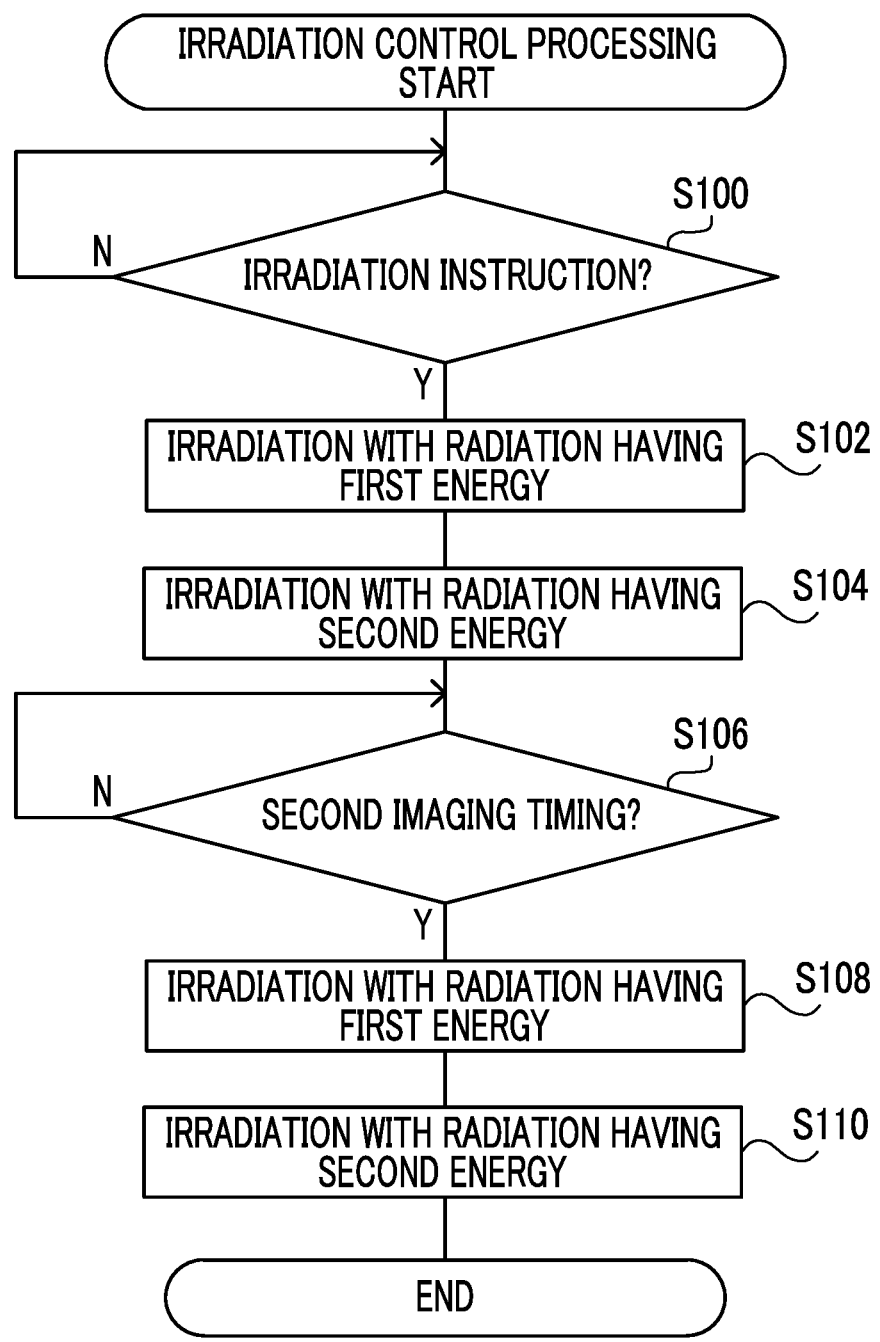
FIG. 8 is a flowchart showing an example of a flow of irradiation control processing executed in the contrast imaging.

Next, in step S14, the mammography apparatus 10 captures the radiation image, specifically, the low-energy image and the high-energy image. In the present embodiment, as described above, the control unit 60 of the console 12 performs control related to the irradiation with the radiation R in the mammography apparatus 10. As an example, in the console 12 according to the present embodiment, the CPU 50A of the control unit 50 executes the irradiation control processing program 51A stored in the ROM 50B to execute irradiation control processing shown in FIG. 8 as an example. FIG. 8 shows a flowchart showing an example of a flow of the irradiation control processing executed in the console 12 according to the present embodiment.

In step S100 of FIG. 8, the control unit 60 determines whether or not the irradiation instruction of the radiation R is received. A negative determination is made in the determination in step S100 until the irradiation instruction is received. On the other hand, in a case in which the irradiation instruction is received, a positive determination is made in the determination in step S100, and the processing proceeds to step S102.

In step S102, the control unit 60 outputs the instruction to perform the irradiation with the radiation R having the first energy to the mammography apparatus 10. In the mammography apparatus 10, the control unit 20 emits the radiation R having the first energy from the radiation source 37R toward the breast based on the instruction input from the console 12, and the low-energy image is captured by the radiation detector 28. In the example shown in FIG. 5, the low-energy image $70L_1$ is captured.

In next step S104, the control unit 60 outputs the instruction to perform the irradiation with the radiation R having the second energy to the mammography apparatus 10. In the mammography apparatus 10, the control unit 20 emits the radiation R having the second energy from the radiation source 37R toward the breast based on the instruction input from the console 12, and the high-energy image is captured by the radiation detector 28. In the example shown in FIG. 5, the high-energy image $70H_1$ is captured.

In next step S106, the control unit 60 determines whether or not the second imaging timing is reached. A negative determination is made in the determination in step S106 until the second imaging timing is reached. On the other hand, in a case in which the second imaging timing is reached, a positive determination is made in the determination in step S106, and the processing proceeds to step S108.

In step S108, the control unit 60 outputs the instruction to perform the irradiation with the radiation R having the first energy to the mammography apparatus 10, as in step S102. The mammography apparatus 10 captures the low-energy image according to the instruction input from the console 12. In the example shown in FIG. 5, the low-energy image $70L_2$ is captured.

In next step S110, the control unit 60 outputs the instruction to perform the irradiation with the radiation R having the second energy to the mammography apparatus 10, as in step S104. The mammography apparatus 10 captures the high-energy image according to the instruction input from the console 12. In the example shown in FIG. 5, the high-energy image $70H_2$ is captured. In a case in which the processing of step S110 ends, the irradiation control processing shown in FIG. 8 ends.

In this way, in a case in which the irradiation control processing shown in FIG. 8 ends, the contrast imaging ends, and the processing of step S14 shown in FIG. 7 ends. It should be noted that the control unit 60 may notify the user that the contrast imaging ends.

Therefore, in next step S18, the compression of the breast is released. Specifically, the control unit 60 outputs an instruction to the mammography apparatus 10 to move the compression plate 40 in a direction away from the imaging table 30. In the mammography apparatus 10, the control unit 50 moves the compression plate 40 in the direction away from the imaging table 30 based on the input instruction. As a result, the compression of the breast is released. It should be noted that the release of the breast compression may be performed according to the instruction of the user, or may be performed automatically according to the end of the contrast imaging.

Figure 9:
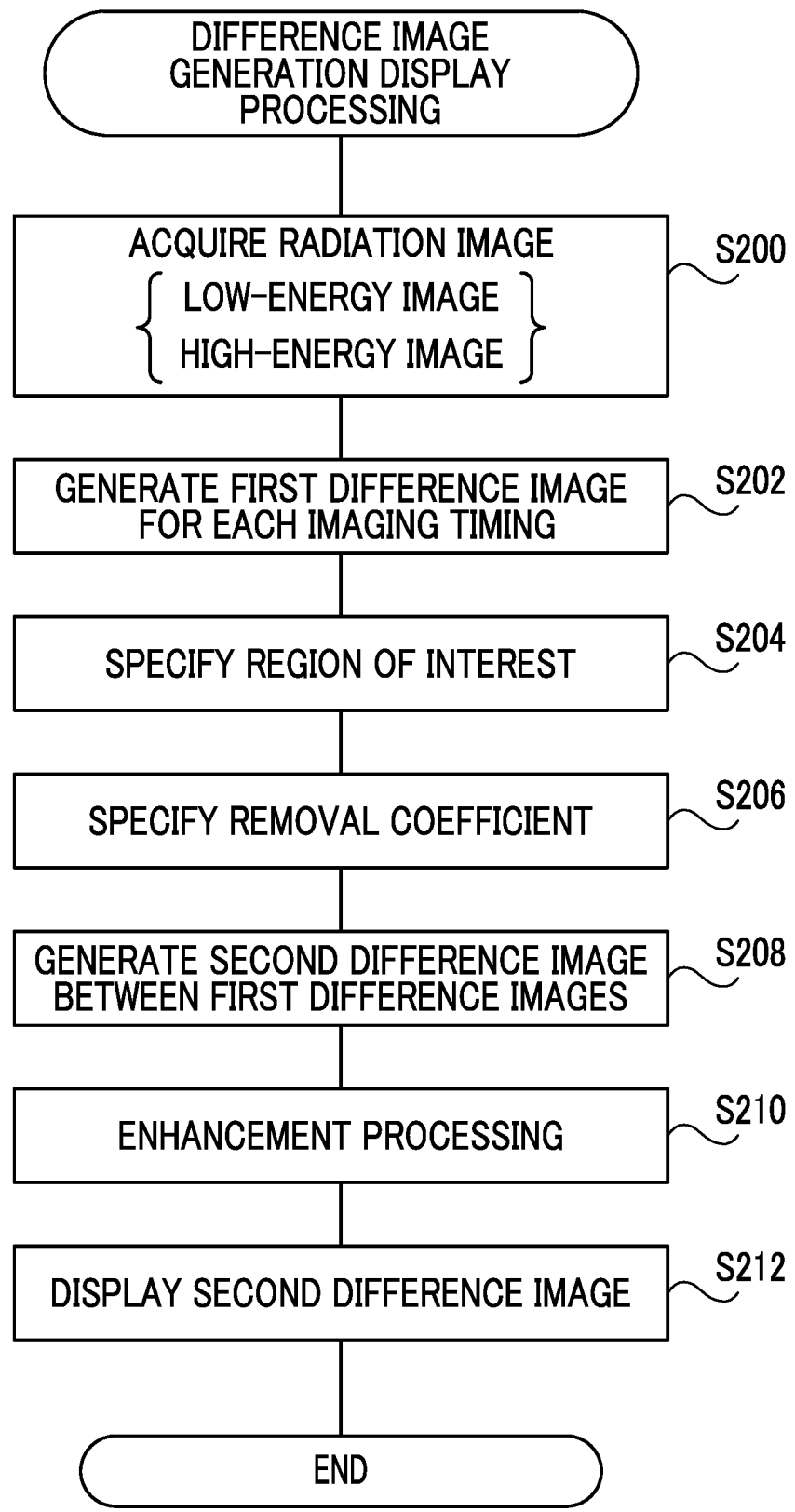
FIG. 9 is a flowchart showing an example of a flow of difference image generation display processing executed in the contrast imaging.

In next step S18, the console 12 performs difference image generation display processing shown in FIG. 9. In the console 12 according to the present embodiment, as an example, the CPU 50A of the control unit 50 executes the image processing program 51B stored in the ROM 50B, thereby executing the difference image generation display processing shown in FIG. 9 as an example. FIG. 9 shows a flowchart showing an example of a flow of the difference image generation display processing executed in the console 12 according to the present embodiment.

In step S200, as described above, the acquisition unit 62 acquires the low-energy image and the high-energy image captured by the contrast imaging from the mammography apparatus 10. It should be noted that a timing at which the acquisition unit 62 acquires the low-energy image and the high-energy image is not limited. For example, the low-energy image and the high-energy image may be acquired from the mammography apparatus 10 each time each of the low-energy image and the high-energy image is captured. In addition, for example, the low-energy image and the high-energy image stored in the storage unit 22 of the mammography apparatus 10 may be acquired after capturing all the low-energy images and the high-energy images ends. In addition, an order of acquiring the low-energy image and the high-energy image is not limited. In the example shown in FIG. 5, the acquisition unit 62 acquires the low-energy images $70L_1$ and $70L_2$ and the high-energy images $70H_1$ and $70H_2$.

In next step S202, the first generation unit 64 of the generation unit 63 generates the first difference image for each imaging timing from the low-energy image and the high-energy image acquired in step S200, as described above. In the example shown in FIG. 5, the first generation unit 64 generates the first difference image $72_1$ showing the difference between the high-energy image $70H_1$ and the low-energy image $70L_1$. In addition, the first generation unit 64 generates the first difference image $72_2$ showing the difference between the high-energy image $70H_2$ and the low-energy image $70L_2$.

In next step S204, the second generation unit 66 of the generation unit 63 specifies the region of interest from the first difference image generated in step S202. In the example shown in FIG. 5, the second generation unit 66 specifies the region of interest from each of the first difference image $72_1$ and the first difference image $72_2$. It should be noted that a method by which the second generation unit 66 specifies the region of interest from the first difference image is not particularly limited. For example, the region of interest may be specified from the first difference image by receiving information about the region of interest input by the user. Specifically, at least one image of the first difference image, the low-energy image, or the high-energy image may be displayed on the display unit 58, and a region designated by the user operating the operation unit 56 on the display image may be received as the information about the region of interest. In addition, for example, the second generation unit 66 may specify the region of interest by applying computer aided diagnosis (CAD) to the first difference image.

In next step S206, the second generation unit 66 specifies the removal coefficient described above. As described above, the second generation unit 66 generates the second difference image by subtracting the image data obtained by multiplying the first difference image obtained at the second imaging timing by the predetermined removal coefficient from the image data of the first difference image obtained at the first imaging timing for each corresponding pixel.

The second generation unit 66 according to the present embodiment specifies the removal coefficient based on the first difference image generated in step S202. A method by which the second generation unit 66 specifies the removal coefficient is not limited, but it is preferable to specify the removal coefficient at which the contrast medium that has permeated the mammary gland structure or the normal region can be more removed. In the example shown in FIG.

6, the second generation unit 66 specifies "2" as the removal coefficient, as described above.

As the method of specifying the removal coefficient, for example, in a case in which the removal coefficient is determined in advance according to the type of the region of interest, the mammary gland mass of the breast, or the like, the second generation unit 66 need only specify the removal coefficient that is determined in advance according to the type of the region of interest, the mammary gland mass of the breast, or the like.

In addition, for example, the second generation unit 66 may specify the removal coefficient at which the sum of the pixel values of the generated second difference images is the smallest. In addition, for example, the second generation unit 66 may specify the removal coefficient at which the sum of the pixel values outside the region of interest in the generated second difference image is the smallest.

In next step S208, as described above, the second generation unit 66 generates the second difference image showing the difference between the first difference images generated in step S202 by using the removal coefficient specified in step 206. In the example shown in FIG. 5, the second generation unit 66 generates the second difference image 74 showing the difference between the first difference image $72_1$ and the first difference image $72_2$.

It should be noted that, unlike the present embodiment, instead of the specification of the removal coefficient as described above, a form may be adopted in which the second generation unit 66 generates the second difference image after matching the contrasts of the first difference images, particularly, the contrasts of at least one of the mammary gland structure or the region other than the region of interest in the first difference image.

In addition, since noise tends to appear in the image as a high-frequency component, the second generation unit 66 may remove the high-frequency component by applying the low-pass filter to the first difference image, and then generate the second difference image from the first difference image having the low-frequency component.

In addition, in a case in which an interval between the first imaging timing and the second imaging timing is widened, the difference between the first difference images is large. Therefore, in order to remove the influence of the interval between the first imaging timing and the second imaging timing, the second generation unit 66 may normalize the second difference image with an interval between the first imaging timing and the second imaging timing.

In next step S210, the second generation unit 66 performs enhancement processing of enhancing the region of interest in the second difference image generated in step S208. As described above with reference to FIG. 6, in the second difference image between the first difference images, the contrast amount (pixel value) of the region of interest is smaller than that in the first difference image obtained at the second imaging timing. In the example shown in FIG. 6, the pixel value of the region of interest $94_2$ in the first difference image $72_2$ obtained at the second imaging timing is "68", whereas the pixel value of the region of interest $94_3$ in the second difference image 74 is "6". Since the pixel value of the region of interest is reduced in this way, the second generation unit 66 performs the enhancement processing of enhancing the region of interest in order to make the region of interest easy to see. As an example, the second generation unit 66 according to the present embodiment performs gradation enhancement processing and frequency enhancement processing on the generated second difference image.

Figure 10:
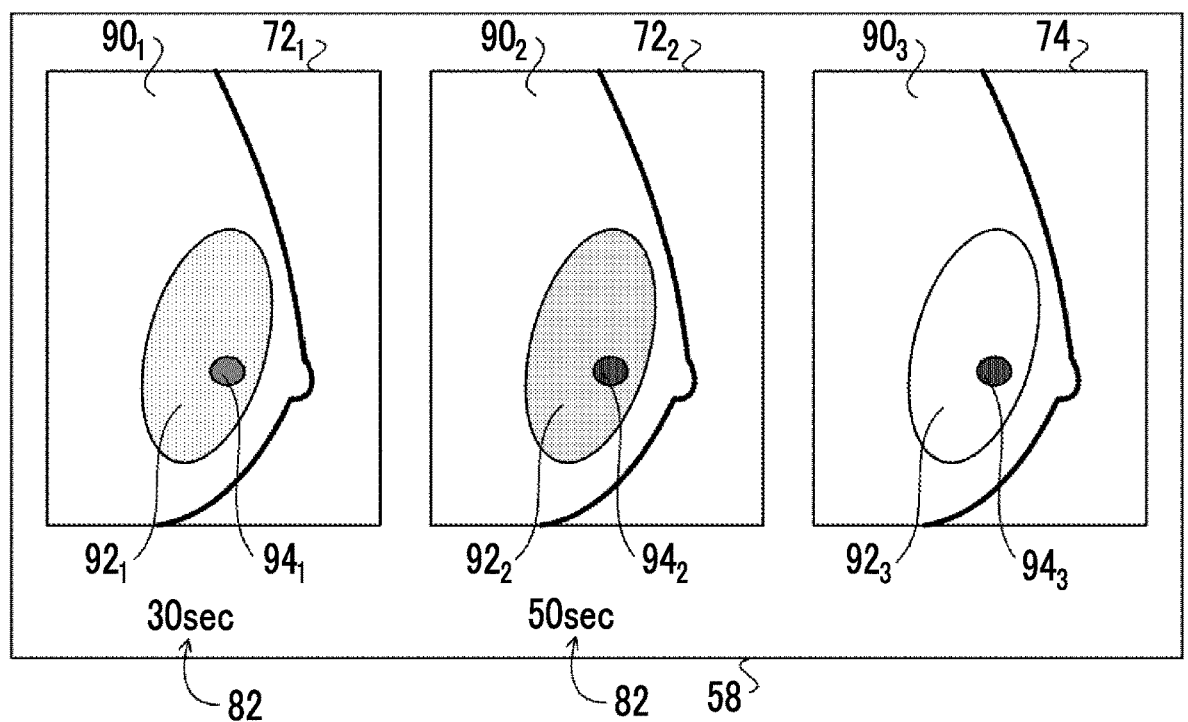
FIG. 10 is a diagram showing an example of a state in which the second difference image is displayed on a display unit.

In next step S212, the display control unit 68 performs control of displaying, on the display unit 58, the second difference image. FIG. 10 shows an example of a state in which the second difference image 74 after the enhancement processing is displayed on the display unit 58. The example shown in FIG. 10 shows a form in which the first difference image $72_1$ obtained at the first imaging timing and the first difference image $72_2$ obtained at the second imaging timing are displayed side by side in the second difference image 74 after the enhancement processing on the display unit 58. It should be noted that, in a case in which a plurality of radiation images including the second difference image 74 are displayed on the display unit 58 in this way, the display form is not limited to the form in which the plurality of radiation images including the second difference image 74 are displayed side by side as shown in FIG. 10. For example, a display form may be adopted in which the plurality of radiation images are displayed according to the instruction of the user or automatically switched, or a display form may be adopted in which the plurality of radiation images are superimposed and displayed. In addition, the low-energy image, the high-energy image, or the like may also be displayed.

In addition, the example shown in FIG. 10 shows a form in which imaging timing information 82 indicating the imaging timing corresponding to each of the first difference image $72_1$ and the first difference image $72_2$ is further displayed. As described above, the display control unit 68 need only display at least the second difference image that has been subjected to the enhancement processing in step S210, and may further display at least one of other radiation images, the information about the contrast imaging, such as the imaging timing, or the information about the contrast amount.

In this way, in a case in which the processing of step S212 ends, the difference image generation display processing shown in FIG. 9 ends, and the difference image generation display processing of step S18 shown in FIG. 7 ends. As a result, the series of processing related to the contrast imaging in the radiography system 1 according to the present embodiment ends. It should be noted that a form may be adopted in which the low-energy image and the plurality of high-energy images, which are captured by the mammography apparatus 10 according to the present embodiment, the plurality of first difference images and the second difference image, which are generated by the console 12, and the like are stored in the storage unit 52 of the console 12, picture archiving and communication systems (PACS), or the like.

In addition, in each form described above, the form has been described in which the difference image generation display processing is performed as the series of processing after the contrast imaging which is the processing of S14 in FIG. 7 ends, but the timing for performing the difference image generation display processing, that is, the timing for generating the first difference image and the second difference image or displaying the second difference image is not limited to the present form. For example, a form may be adopted in which the timing of each of the generation of the first difference image and the second difference image, and the display of the second difference image is a timing according to the user's desire after the contrast imaging.

As described above, the console 12 of each form described above comprises the CPU 50A as at least one processor. The CPU 50A acquires the low-energy image captured by the mammography apparatus 10 by emitting the radiation R having the first energy to the breast into which the contrast medium has been injected, and the plurality of high-energy images captured by the mammography apparatus 10 by emitting the radiation R having the second energy higher than the first energy, at a plurality of different imaging timings after the injection of the contrast medium. In addition, the CPU 50A generates the second difference image showing the difference between the plurality of first difference images showing the difference of the low-energy image and each of the plurality of high-energy images to remove the pixel value corresponding to the contrast medium that has permeated outside the region of interest.

As described above, the console 12 according to the present embodiment generates the second difference image showing the difference between the first difference images showing the difference between the high-energy image and the low-energy image. Therefore, the console 12 can make the second difference image to be the image in which the pixel value corresponding to the contrast medium that has permeated the mammary gland structure other than the object of interest is not included or the like, or the image in which the contrast amount is reduced even in a case in which the pixel value corresponding to the contrast medium that has permeated outside the object of interest is included. Therefore, with the console 12 according to the present embodiment, it is possible to obtain the radiation image (second difference image) in which the region of interest in which the contrast medium has permeated is more easily seen.

Figure 11:
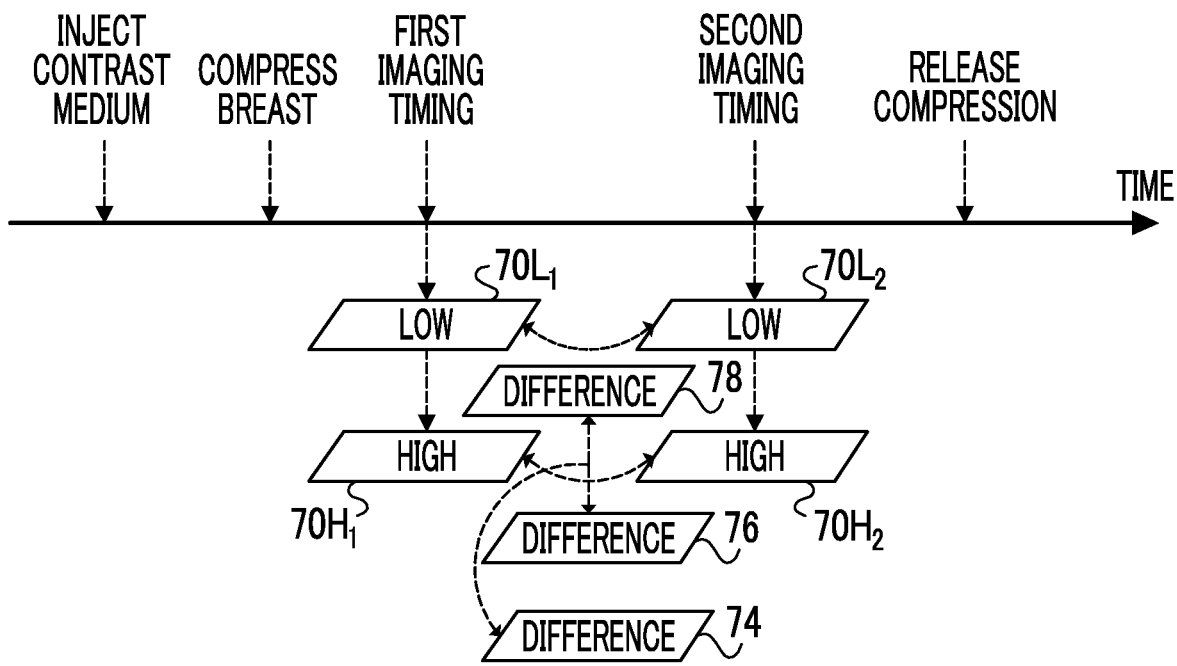
FIG. 11 is a diagram for describing another example of the generation method of the second difference image.

It should be noted that a method by which the generation unit 63 generates the first difference image and the second difference image is not limited to the form described above. For example, the difference image showing the difference between the low-energy images at each imaging timing may be generated, the difference image showing the difference between the high-energy images may be generated, and then the difference image showing the difference between the two difference images may be generated. In this case as well, the finally generated difference image corresponds to the second difference image. In the example shown in FIG. 11, the generation unit 63 generates a third difference image 76 showing the difference between the high-energy image $70H_2$ and the high-energy image $70H_1$. In addition, the generation unit 63 generates a fourth difference image 78 showing the difference between the low-energy image $70L_2$ and the low-energy image $70L_1$. Further, the generation unit 63 generates the second difference image 74 showing the difference between the fourth difference image 78 and the third difference image 76. It should be noted that the third difference image 76 according to the present form is an example of a third difference image according to the present disclosure, and the fourth difference image 78 is an example of a fourth difference image according to the present disclosure.

Figure 12:
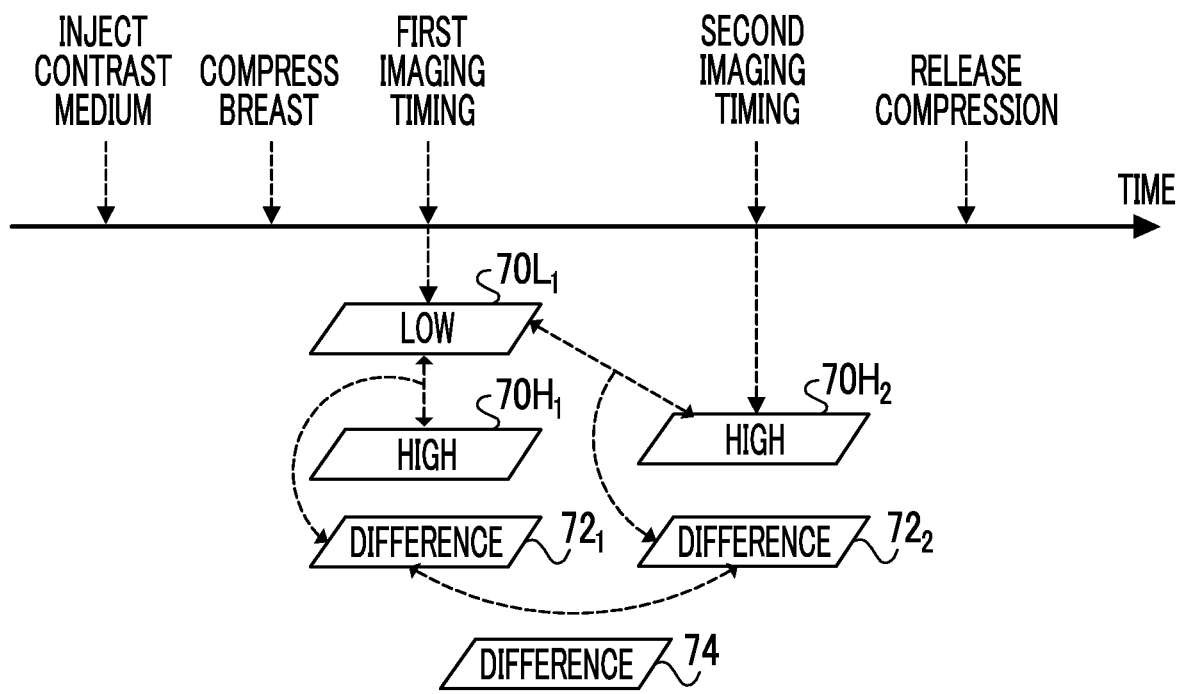
FIG. 12 is a diagram for describing another example of the generation method of the first difference image and the second difference image.

In addition, in the form described above, the form has been described in which both the low-energy image and the high-energy image are captured at each imaging timing, but the imaging timing of the low-energy image is not limited to the present form. As described above, the low-energy image is the image in which almost no contrast medium is reflected, and the body tissue, such as the mammary gland, is clearly reflected. Therefore, in a case in which the body movement is not taken into consideration, the low-energy image is the same image regardless of the imaging timing. Therefore, the imaging timing of the low-energy image is not limited. In addition, the number of times of capturing of the low-energy image may not be the same as the number of times of capturing of the high-energy image. As an example, FIG. 12 shows a form in which the low-energy image is captured only at the first imaging timing out of the first imaging timing and the second imaging timing. In this case, the generation unit 63 generates the first difference image $72_1$ showing the difference between the high-energy image $70H_1$ and the low-energy image $70L_1$. In addition, the generation unit 63 generates the first difference image 722 showing the difference between the high-energy image $70H_2$ and the low-energy image $70L_1$. Further, the generation unit 63 generates the second difference image 74 showing the difference between the first difference image $72_2$ and the first difference image $72_1$.

In addition, in the form described above, the form has been described in which the imaging timing is two times, but the imaging timing may be two or more times. In a case in which the imaging timing is set to 3 or more times, for example, a plurality of second difference images 74 can be generated.

In addition, in the form described above, the form has been described in which the low-energy image is first captured in the contrast imaging, but the present disclosure is not limited to the present form, and a form may be adopted in which the high-energy image is captured first.

In addition, in the form described above, the form has been described in which the breast is applied as an example of the subject according to the present disclosure, and the mammography apparatus 10 is applied as an example of the radiography apparatus according to the present disclosure, but the subject is not limited to the breast, and the radiography apparatus is not limited to the mammography apparatus. For example, the subject may be a chest, an abdomen, or the like, and a form may be adopted in which a radiography apparatus other than the mammography apparatus is applied as the radiography apparatus.

In addition, in the form described above, the form has been described in which the console 12 is an example of the image processing apparatus according to the present disclosure, but an apparatus other than the console 12 may have the function of the image processing apparatus according to the present disclosure. In other words, some or all of the functions of the control unit 60, the acquisition unit 62, the generation unit 63, and the display control unit 68 may be provided in an apparatus other than the console 12, for example, the mammography apparatus 10 or an external apparatus.

In addition, in the form described above, various processors shown below can be used as the hardware structure of processing units that execute various pieces of processing, such as the control unit 60, the acquisition unit 62, the generation unit 63, and the display control unit 68.

As described above, the various processors include, in addition to the CPU which is a general-purpose processor which executes software (program) and functions as various processing units, a programmable logic device (PLD) which is a processor of which a circuit configuration can be changed after manufacture, such as a field programmable gate array (FPGA), and a dedicated electric circuit which is a processor having a circuit configuration which is designed for exclusive use in order to execute specific processing, such as an application specific integrated circuit (ASIC).

One processing unit may be composed of one of the various processors or may be composed of a combination of two or more processors of the same type or different types (for example, a combination of a plurality of FPGAs or a combination of a CPU and an FPGA). In addition, a plurality of processing units may be composed of one processor.

A first example of the configuration in which the plurality of processing units are composed of one processor is a form in which one processor is composed of a combination of one or more CPUs and software and the processor functions as the plurality of processing units, as represented by the computer, such as a client and a server. Second, as represented by a system on chip (SoC) or the like, there is a form of using a processor that realizes the function of the entire system including the plurality of processing units by one integrated circuit (IC) chip. As described above, various processing units are composed of one or more of the various processors as the hardware structure.

Further, more specifically, an electric circuit (circuitry) obtained by combining circuit elements, such as semiconductor elements, can be used as the hardware structure of the various processors.

In addition, in each embodiment described above, the aspect has been described in which the irradiation control processing program 51A and the image processing program 51B are stored (installed) in advance in the ROM 50B, but the present disclosure is not limited to this. Each of the irradiation control processing program 51A and the image processing program 51B may be provided in a form being recorded in the recording medium, such as a compact disc read only memory (CD-ROM), a digital versatile disc read only memory (DVD-ROM), and a universal serial bus (USB) memory. In addition, a form may be adopted in which each of the irradiation control processing program 51A and the image processing program 51B is downloaded from an external apparatus via a network.

The disclosure of JP2020-162700 filed on Sep. 28, 2020 is incorporated in the present specification by reference in its entirety.

All documents, patent applications, and technical standards described in the present specification are incorporated in the present specification by reference to the same extent as a case in which each document, patent application, and technical standard are specifically and individually noted to be incorporated by reference.

What is claimed is:

1. An image processing apparatus comprising:
at least one processor that is configured to:
acquire, at a first imaging timing, a first low-energy image captured by a radiography apparatus by emitting radiation having first energy to a subject into which a contrast medium has been injected, and a first high-energy image captured by the radiography apparatus by emitting radiation having second energy higher than the first energy,
acquire, at a second imaging timing after the first imaging timing, at least a second high-energy image captured by the radiography apparatus by emitting radiation having the second energy;
generate a first difference image showing a difference between the first low-energy image and the first high-energy image;
generate a second difference image showing a difference between the first low-energy image and the second high-energy image; and
generate a third difference image showing a difference between the first difference image and the second difference image to remove a pixel value corresponding to the contrast medium that has permeated outside a region of interest.

2. The image processing apparatus according to claim 1, wherein the at least one processor is configured to:
identify a removal coefficient at which a sum of pixel values of the third difference image is the smallest, and
generate the third difference image by subtracting image data obtained by multiplying the first difference image by the removal coefficient from image data of the second difference image for each corresponding pixel.

3. The image processing apparatus according to claim 1, wherein the at least one processor is configured to:
identify a removal coefficient at which a sum of pixel values outside the region of interest in the third difference image is the smallest, and
generate the third difference image by subtracting image data obtained by multiplying the first difference image by the removal coefficient from image data of the second difference image for each corresponding pixel.

4. The image processing apparatus according to claim 1, wherein the at least one processor is configured to generate the third difference image after matching contrasts of the first and second difference images with each other.

5. The image processing apparatus according to claim 4, wherein the at least one processor is configured to match contrasts of at least one of a mammary gland structure or a region other than a region of interest in the first and second difference images.

6. The image processing apparatus according to claim 1, wherein the at least one processor is configured to normalize the third difference image based on an interval of the first and second imaging timings.

7. The image processing apparatus according to claim 1, wherein the at least one processor is configured to perform image processing of enhancing the region of interest on the third difference image.

8. The image processing apparatus according to claim 1, wherein the at least one processor is configured to:
further acquire, at the second imaging timing, a second low-energy image by emitting the radiation having the first energy, and
generate the second difference image as an image showing a difference between the second low-energy image and the second high-energy image.

9. The image processing apparatus according to claim 1, wherein the radiography apparatus is a mammography apparatus.

10. An image processing method executed by a computer, the method comprising:
acquiring, at a first imaging timing, a first low-energy image captured by a radiography apparatus by emitting radiation having first energy to a subject into which a contrast medium has been injected, and a first high-energy image captured by the radiography apparatus by emitting radiation having second energy higher than the first energy;
acquiring, at a second imaging timing after the first imaging timing, at least a second high-energy image captured by the radiography apparatus by emitting radiation having the second energy;
generating a first difference image showing a difference between the first low-energy image and the first high-energy image;
generating a second difference image showing a difference between the first low-energy image and the second high-energy image; and
generating a third difference image showing a difference between the first difference image and the second difference image to remove a pixel value corresponding to the contrast medium that has permeated outside a region of interest.

11. A non-transitory storage medium storing a program causing a computer to execute an image processing, the image processing comprising:

acquiring, at a first imaging timing, a first low-energy image captured by a radiography apparatus by emitting radiation having first energy to a subject into which a contrast medium has been injected, and a first high-energy images captured by the radiography apparatus by emitting radiation having second energy higher than the first energy;

acquiring, at a second imaging timing after the first imaging timing, at least a second high-energy image captured by the radiography apparatus by emitting radiation having the second energy;

generating a first difference images showing a difference between the first low-energy image and the first high-energy image;

generating a second difference image showing a difference between the first low-energy image and the second high-energy image; and generating a third difference image showing a difference between the first difference image and the second difference image to remove a pixel value corresponding to the contrast medium that has permeated outside a region of interest.

* * * * *